United States Patent
Choi et al.

(10) Patent No.: US 9,575,361 B2
(45) Date of Patent: Feb. 21, 2017

(54) REFLECTION SHEET AND BACKLIGHT UNIT INCLUDING THE SAME

(71) Applicant: Samsung Display Co., Ltd., Yongin, Gyeonggi-do (KR)

(72) Inventors: Kwang Wook Choi, Osan-si (KR); Young Min Park, Hwaseong-si (KR); Young Keun Lee, Suwon-si (KR); Jae Sang Lee, Asan-si (KR); Sang Ho Hwang, Suwon-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 115 days.

(21) Appl. No.: 14/338,124

(22) Filed: Jul. 22, 2014

(65) Prior Publication Data

US 2015/0261041 A1    Sep. 17, 2015

(30) Foreign Application Priority Data

Mar. 17, 2014    (KR) .................. 10-2014-0031138

(51) Int. Cl.
*G02F 1/1335*    (2006.01)

(52) U.S. Cl.
CPC ............................... *G02F 1/133605* (2013.01)

(58) Field of Classification Search
CPC ..................... G02B 6/0055; G02B 6/0081
USPC ............................................ 349/67; 362/97.1
See application file for complete search history.

(56) References Cited

U.S. PATENT DOCUMENTS

| 6,867,825 B2 | 3/2005 | Kanatsu et al. |
| 7,001,048 B2 | 2/2006 | Kuo et al. |
| 2007/0153511 A1 | 7/2007 | Chou |
| 2007/0236628 A1 | 10/2007 | Epstein |
| 2009/0086508 A1 | 4/2009 | Bierhuizen |
| 2011/0286211 A1 | 11/2011 | Kubota |
| 2012/0293985 A1 | 11/2012 | Nozawa |
| 2013/0271694 A1 | 10/2013 | Chang et al. |
| 2014/0218661 A1* | 8/2014 | Tanabe .............. G02F 1/133605 349/62 |

FOREIGN PATENT DOCUMENTS

| JP | 2011-034955 A | 2/2011 |
| KR | 10-2004-0062174 A | 7/2004 |
| KR | 10-2005-0067858 A | 7/2005 |
| KR | 10-2005-0107034 A | 11/2005 |

* cited by examiner

*Primary Examiner* — Laura Tso
*Assistant Examiner* — Naomi M Wolford
(74) *Attorney, Agent, or Firm* — Knobbe, Martens, Olson & Bear, LLP

(57) ABSTRACT

A reflection sheet and backlight unit including the same are disclosed. In one aspect, the reflection sheet includes a bottom surface, a plurality of side surfaces, each extending from the bottom surface and having an edge opposing the bottom surface, and a first cutting line formed in at least a first one of the side surfaces from a boundary between the first side surface and the bottom surface toward the opposing edge of the first side surface. The reflection sheet also includes a cover surface extending from the opposing edge of the first side surface, wherein the cover surface comprises a protruding surface protruding toward the first cutting line.

22 Claims, 25 Drawing Sheets

REFLECTION SHEET AND BACKLIGHT UNIT INCLUDING THE SAME

INCORPORATION BY REFERENCE TO ANY PRIORITY APPLICATIONS

This application claims priority from Korean Patent Application No. 10-2014-0031138 filed on Mar. 17, 2014 in the Korean Intellectual Property Office, the disclosure of which is incorporated herein by reference in its entirety.

BACKGROUND

Field

The described technology generally relates to a reflection sheet and a backlight unit including the same.

Description of the Related Technology

Liquid crystal displays (LCDs) are of great importance in information display technology. LCDs include two glass substrates and a liquid crystal layer interposed between the two glass substrates. LCDs change the alignment of the liquid crystals within the liquid crystal layer by applying voltages to the liquid crystals through electrodes formed on and under the glass substrates. Accordingly, light passing through the liquid crystal layer is attenuated based on the applied voltage and the LCD displays information as a result.

LCDs are not self-emissive and can only display images by controlling the transmittance of light emitted from a light source. Therefore, LCDs require a device for irradiating light to a display panel, that is, a backlight unit.

Backlight units utilize a reflection sheet in order to provide light emitted from a light source to the entire surface of a display panel with a substantially uniform luminance distribution. Reflection sheets reflect light emitted from the light source such that the reflected light is incident upon the display panel. In addition, reflection sheets reflect light that is reflected from an optical film located above the light sources. The use of the reflection sheet can minimize the number of light sources required in the backlight unit and can provide light with a substantially uniform luminance distribution to the display panel.

SUMMARY OF CERTAIN INVENTIVE ASPECTS

One inventive aspect is a reflection sheet which can provide light with a substantially uniform luminance distribution to a display panel and a backlight unit including the reflection sheet.

Another aspect is a reflection sheet which can be easily assembled and can improve the uniformity of light reflected therefrom and a backlight unit including the reflection sheet.

However, aspects of the described technology are not restricted to those set forth herein. The above and other aspects will become more apparent to one of ordinary skill in the art to which the described technology pertains by referencing the detailed description given below.

Another aspect is a reflection sheet comprising a bottom surface, a plurality of side surfaces which extend from the bottom surface, a first cutting line which is formed in at least one of the side surfaces by cutting the at least one side surface from a boundary between the at least one side surface and the bottom surface toward an opposite end of the at least one side surface, and a first cover surface which extends from the opposite end of the at least one side surface, wherein the first cover surface may comprise a first protruding surface protruding toward in a direction in which the first cutting line is formed.

The reflection sheet may further comprise a first folding line which is formed along at least part of a boundary between the bottom surface and each of the side surfaces.

The reflection sheet may further comprise a second folding line which is formed along a boundary between the first cover surface and the at least one side surface.

The reflection sheet may further comprise a third folding line which is formed between at least one of the side surfaces and another side surface adjacent to the side surface.

The reflection sheet may further comprise a second cutting line which is connected to the first cutting line and formed by partially cutting the boundary between the at least one side surface and the bottom surface.

The bottom surface may comprise a corner.

The second cutting line may extend to the corner of the bottom surface.

The first cutting line may be formed at a location adjacent to the corner of the bottom surface.

The reflection sheet may further comprise a third folding line which is formed between at least one of the side surfaces and another side surface adjacent to the side surface, wherein the third folding line extends to the corner of the bottom surface.

The reflection sheet may be formed as one sheet.

Another aspect is a reflection sheet comprising a bottom surface, a plurality of side surfaces which extend from the bottom surface, a first cutting line which is formed in at least one of the side surfaces by cutting the at least one side surface from a boundary between the at least one side surface and the bottom surface toward an opposite end of the at least one side surface, a wing surface which extends from the opposite end of the at least one side surface, is parallel to the boundary between the at least one side surface and the bottom surface, and protrudes toward a direction in which the first cutting line is formed, and a second cover surface which extends from the wing surface.

The reflection sheet may further comprise a fourth folding line which is formed between the wing surface and the second cover surface.

The reflection sheet may further comprise a fifth folding line which is formed along a boundary between the wing surface and the at least one side surface.

The reflection sheet may further comprise a second protruding surface which protrudes toward the at least one side surface.

Another aspect is a backlight unit comprising a light source, a bottom chassis which houses the light source and comprises a bottom portion and a plurality of sidewalls, and a reflection sheet which is placed on the bottom chassis and covers the bottom portion and the sidewalls, wherein the reflection sheet may comprise a bottom surface which covers the bottom portion of the bottom chassis, a plurality of side surfaces which cover the sidewalls of the bottom chassis, a first cutting line which is formed in at least one of the side surfaces by cutting the at least one side surface from a boundary between the at least one side surface and the bottom surface toward an opposite end of the at least one side surface, and a first cover surface which extends from the opposite end of the at least one side surface, wherein the first cover surface may be placed between the at least one side surface of the reflection sheet and a corresponding sidewall of the bottom chassis to cover the first cutting line.

The reflection sheet may further comprise a second folding line which is formed along a boundary between the first cover surface and the at least one side surface, wherein the first cover surface is folded into a space between the at least one side surface of the reflection sheet and the corresponding sidewall of the bottom chassis to cover the first cutting line.

The corresponding sidewall of the bottom chassis may comprise an engraved hole having a shape corresponding to a shape of the first cover surface, wherein the engraved hole may be formed at a location where the first cover surface and the corresponding sidewall contact each other.

The first cover surface may be inserted into the engraved hole.

The sidewalls of the bottom chassis may slope at an acute angle to the bottom portion.

A height from the bottom surface of the reflection sheet to an upper end of each of the side surfaces may be about 0.3 mm to about 0.5 mm.

Another aspect is a reflection sheet for a backlight, comprising a bottom surface; a plurality of side surfaces, each extending from the bottom surface and having an edge opposing the bottom surface; a first cutting line formed in at least a first one of the side surfaces from a boundary between the first side surface and the bottom surface toward the opposing edge of the first side surface; and a cover surface extending from the opposing edge of the first side surface, wherein the cover surface comprises a protruding surface protruding toward the first cutting line.

The reflection sheet can further comprise a first folding line formed along at least part of the boundary between the bottom surface and each of the side surfaces. The reflection sheet can further comprise a second folding line formed along a boundary between the cover surface and the first side surface. The reflection sheet can further comprise a third folding line formed between two adjacent side surfaces of the side surfaces. The reflection sheet can further comprise a second cutting line connected to the first cutting line and formed along the boundary between the first side surface and the bottom surface. The bottom surface can comprise a corner. The second cutting line can extend to the corner of the bottom surface. The first cutting line can be formed adjacent to the corner of the bottom surface. The reflection sheet can further comprise a third folding line formed between two adjacent side surfaces of the side surfaces, wherein the third folding line extends to the corner of the bottom surface. The reflection sheet can be formed as a single sheet.

Another aspect is a reflection sheet for a backlight, comprising a bottom surface; a plurality of side surfaces, each extending from the bottom surface and having an edge opposing the bottom surface; a cutting line formed in at least a first one of the side surfaces from a boundary between the first side surface and the bottom surface toward the opposing edge of the first side surface; a wing surface extending from the edge of the first side surface, wherein the wing surface is substantially parallel to the boundary between the first side surface and the bottom surface and protrudes toward the cutting line; and a cover surface extending from the wing surface.

The reflection sheet can further comprise a first folding line formed between the wing surface and the cover surface. The reflection sheet can further comprise a second folding line formed along a boundary between the wing surface and the first side surface. The cover surface can further comprise a protruding surface which protrudes toward the first side surface.

Another aspect is a backlight unit, comprising a light source; a bottom chassis housing the light source and comprising a bottom portion and a plurality of sidewalls; and a reflection sheet placed on the bottom chassis and covering the bottom portion and the sidewalls, wherein the reflection sheet comprises: a bottom surface covering the bottom portion of the bottom chassis; a plurality of side surfaces respectively covering the sidewalls of the bottom chassis, wherein each side surface has an edge opposing the bottom surface; a cutting line formed in at least a first one of the side surfaces from a boundary between the first side surface and the bottom surface toward the opposing edge of the first side surface; and a cover surface which extends from the opposing edge of the first side surface, wherein the cover surface is placed between the first side surface of the reflection sheet and a corresponding sidewall of the bottom chassis so as to cover the cutting line.

The backlight unit can further comprise a folding line formed along a boundary between the cover surface and the first side surface, wherein the bottom chassis comprises a recess and wherein the cover surface is folded into the recess. The corresponding sidewall of the bottom chassis can comprise a recess having a shape corresponding to the shape of the cover surface, wherein the recess is formed in a location where the cover surface and the corresponding sidewall contact each other. The cover surface can be inserted into the recess. The sidewalls of the bottom chassis can form an obtuse angle with the bottom portion. The height from the bottom surface of the reflection sheet to an upper end of each of the side surfaces can be about 0.3 mm to about 0.5 mm.

Other features and aspects will be apparent from the following detailed description, the drawings, and the claims.

DETAILED DESCRIPTION OF CERTAIN INVENTIVE EMBODIMENTS

Figure 1:
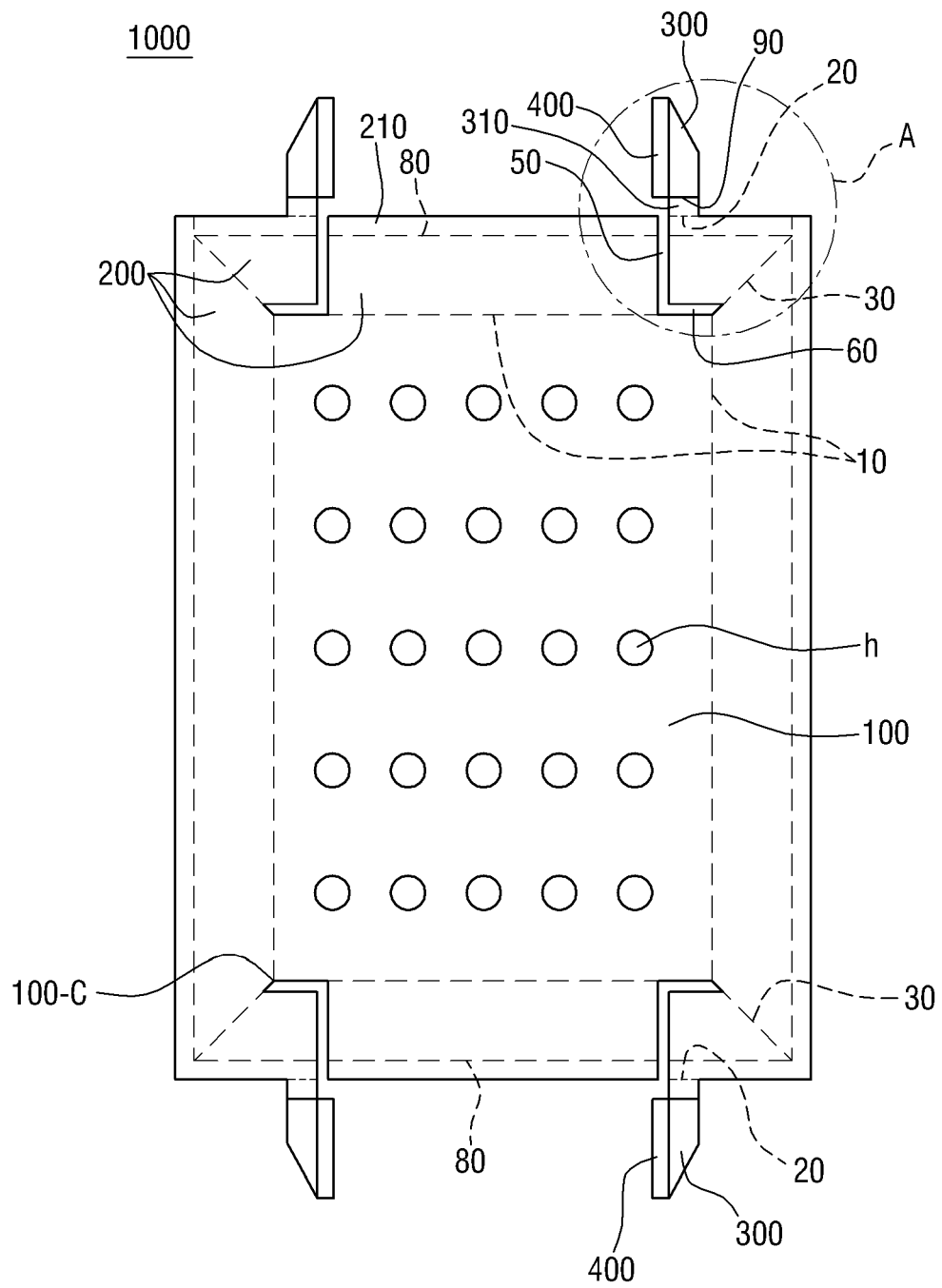
FIG. 1 is a planar view of a reflection sheet according to an embodiment.

As display devices are manufactured with thinner profiles, the space allocated for a backlight unit with such a display device is reduced. Accordingly, the devices that form the backlight unit are required to be elaborate to fit within the allocated space. In particular, a reflection sheet is required to provide light with a uniform luminance distribution to a display panel. Therefore, research is being conducted into reflection sheets that can provide superior reflectivity and superior luminance uniformity even in display devices having thin profiles.

The aspects and features of the described technology and methods for achieving the aspects and features will be apparent by referring to the embodiments to be described in detail with reference to the accompanying drawings. However, the described technology is not limited to the embodiments disclosed hereinafter, but can be implemented in diverse forms. The matters defined in the description, such as the detailed construction and elements, are only specific details provided to assist those of ordinary skill in the art in a comprehensive understanding of the described technology and the described technology is only defined within the scope of the appended claims.

The term "on" is used to designate that an element is on another element or located on a different layer and refers to both when the element is located directly on the other element or layer and when the element is located indirectly on the other element or layer with one or more additional layers or elements interposed therebetween. Throughout the entire description, the same drawing reference numerals are used to designate the same elements across the various figures.

Although the terms "first," "second," and so forth are used to describe diverse constituent elements, these elements are not limited by the terms. The terms are used only to differentiate one element from other elements. Accordingly, in the following description, a first constituent element may be termed a second constituent element without departing from the disclosure of the described technology.

Hereinafter, embodiments of the described technology will be described with reference to the accompanying drawings.

FIG. 1 is a planar view of a reflection sheet 1000 according to an embodiment.

Referring to FIG. 1, the reflection sheet 1000 includes a bottom surface 100 and a plurality of side surfaces 200 which extend from the bottom surface 100. A first cutting line 50 is formed in at least one of the side surfaces 200 by cutting the at least one side surface 200 from a boundary between the at least one side surface 200 and the bottom surface 100 toward an opposite end of the at least one side surface 200. The reflection sheet 1000 also includes a first cover surface 300 which extends from the opposite end of the at least one side surface 200. The first cover surface 300 includes a first protruding surface 400 protruding toward the first cutting line 50.

The bottom surface 100 can be placed on the bottom portion of a bottom chassis of a backlight unit which will be described later. The bottom surface 100 reflects light emitted from a light source toward a display panel located thereabove. The bottom surface 100 illustrated in FIG. 1 is substantially quadrilateral. However, the shape of the bottom surface 100 is not limited to the quadrilateral shape and may vary according to the shape of the display panel.

The side surfaces 200 extend from the bottom surface 100. When the bottom surface 100 has a substantially quadrilateral shape, the side surfaces 200 extend from the four sides of the bottom surface 100. One side surface 200 or a plurality of side surfaces 200 can be formed on each side of the bottom surface 100. In FIG. 1, three side surfaces 200 are formed on each of the upper and lower sides of the bottom surface 100 and one side surface 200 is formed on each of the left and right sides of the bottom surface 100. In addition, a side surface 200 extending from the left side or the right side of the bottom surface 100 can be connected to a side surface 200 extending from the upper side or the lower side of the bottom surface 100. That is, the side surfaces 200 may extend from various locations on the bottom surface 100 based on the location of the first cutting line 50.

The reflection sheet 1000 includes the first cutting line 50 formed by cutting at least one of the side surfaces 200 from a boundary between the at least one side surface 200 and the bottom surface 100 toward the opposite end of the at least one side surface 200. The first cutting line 50 of the reflection sheet 1000 enables the at least one side surface 200 to be freely folded obliquely upward in the planar view of the reflection sheet 1000 formed in the same plane. The first cutting line 50 may be formed by cutting the at least one side surface 200 from a location on the bottom surface 100, from which the at least one side surface 200 extends, toward the opposite end of the at least one side surface 200. Here, the opposite end refers to an end of the at least one side surface 200 which does not contact the bottom surface 100. Therefore, in FIG. 1, the first cutting line 50 extends from the boundary between the bottom surface 100 and the at least one side surface 200 to the opposite end of the at least one side surface 200.

The reflection sheet 1000 include the first cover surface 300 which extends from the opposite end of the at least one side surface 200. As described above, the opposite end refers to an end of any one side surface 200 which is opposite a location at which the bottom surface 100 and the side surface 200 are connected to each other.

The first cover surface 300 is connected to the opposite end of the at least one side surface 200, specifically, to at least part of the opposite end of the at least one side surface 200. That is, the first cover surface 300 is narrower than the at least one side surface 200. In FIG. 1, the first cover surface 300 is tapered, that is, becomes narrower as the distance from the opposite end of the at least one side surface 200 increases. However, the shape of the first cover surface 300 is not limited to the tapered shape and the first cover surface 300 can have various shapes such as a quadrilateral and a triangle.

The first cover surface 300 includes the first protruding surface 400 protruding in the direction in which the first cutting line 50 is formed. The first protruding surface 400 extends from the first cover surface 300. More specifically, when the first cover surface 300 extends from the at least one side surface 200 in a first direction, the first protruding surface 400 extends from the first direction toward the first cutting line 50. For example, in the area 'A' of FIG. 1, the first protruding surface 400 protrudes to the left toward the first cutting line 50 from the area in which the side surface 200 and the first cover surface 300 are formed.

However, the described technology is not limited thereto. For example, the first protruding surface 400 formed to the left of the portion 'A' of FIG. 1 protrudes to the right toward the first cutting line 50. As will be described later, when the reflection sheet 1000 is assembled and then placed in the backlight unit, the first protruding surface 400 is folded to the back of the at least one side surface 200 to cover the first cutting line 50. The direction in which the first protruding surface 400 protrudes varies based on the location of the first cutting line 50.

The reflection sheet 1000 further includes a first folding line 10 formed along at least part of the boundary between the bottom surface 100 and each of the side surfaces 200. The first folding line 10 enables the bottom surface 100 and each of the side surfaces 200 to be easily folded into the desired shape. When the reflection sheet 1000 is placed in the bottom chassis which will be described later, it can be easily folded and assembled according to the size or shape of the bottom chassis.

The first folding line 10 may be formed along all or part of the boundary between the bottom surface 100 and each of the side surfaces 200. For example, in FIG. 1, the first folding line 10 is formed along part of the boundary between the bottom surface 100 and a side surface 200 on the upper and lower sides of the bottom surface 100. In addition, the first folding line 10 is formed along the entire boundary between the bottom surface 100 and the side surface 200 on the left and right sides of the bottom surface 100.

The first folding line 10 may be partially interrupted at the boundary between the bottom surface 100 and the side surface 20. Interrupted and uninterrupted portions of the first folding line 10 may be repeated. The interrupted portion and the uninterrupted portion may be repeated in the same pattern and/or the interrupted portion and the uninterrupted portion may have substantially equal lengths. However, the described technology is not limited thereto, and the interrupted portion and the uninterrupted portion may not be repeated in the same pattern, or the interrupted portion and the uninterrupted portion may not have equal lengths.

The reflection sheet 1000 further includes a second folding line 20 formed along the boundary between the first cover surface 300 and the at least one side surfaces 200. When the reflection sheet 1000 is assembled, the second folding line 20 enables the first cover surface 300 to be easily folded to the back of the at least one side surface 200 and to a predetermined location. The method of forming the second folding line 20 may be the same as the above-described method of forming the first folding line 10, and thus a detailed description thereof will be omitted.

The reflection sheet 1000 further includes a third folding line 30 formed between two adjacent side surfaces 200. The third folding line 30 the enables adjacent side surfaces 200 to be easily folded in a desired way. When the reflection sheet 1000 is assembled, the angle between adjacent side surfaces 200 of the reflection sheet 1000 may be changed by the third folding line 30. That is, as adjacent side surfaces 200 are folded along the third folding line 30, the angler between the side surfaces 200 may be changed. Accordingly, the side surfaces 200 of the reflection sheet 1000 can be assembled to cover all sides of the bottom surface 100. For example, in FIG. 1, the third folding line 30 is formed at four corners of the quadrilateral bottom surface 100. Thus, when the reflection sheet 1000 is assembled, the side surfaces 200 of the reflection sheet 1000 surrounds all of the four corners of the bottom surface 100.

The reflection sheet 1000 may further include a second cutting line 60 which is connected to the first cutting line 50 and formed by partially cutting the boundary between the at least one side surface 200 and the bottom surface 100. That is, the second cutting line 60 may be formed along part of the boundary between the at least one side surface 200 and the bottom surface 100 and extend from the first cutting line 50. Since the second cutting line 60 separates the at least one side surface 200 having the second cutting line 60 from the bottom surface 100, the at least one side surface can move freely. Therefore, when the reflection sheet 1000 is assembled, the angle formed by the bottom surface 100 and the at least one side surface 200 can be changed. In other words, while the bottom surface 100 and the at least one side surface 200 lie in the same plane in the planar view, they are, when assembled, separated by the first cutting line 50 and the second cutting line 60. Therefore, the at least one side surface 200 can be made to stand obliquely from the bottom surface 100.

As described above, the bottom surface 100 includes corners 100-C. In FIG. 1, since the bottom surface 100 is substantially quadrilateral, it includes four corners 100-C, but the described technology is not limited thereto.

The first cutting line 50 and the second cutting line 60 may be formed at a location adjacent to each corner 100-C of the bottom surface 100, and the second cutting line 60 may extend up to each corner 100-C of the bottom surface 100. That is, the second cutting line 60 may extend from the first cutting line 50 to an adjacent corner 100-C of the bottom surface 100. Accordingly, the movement of the at least one side surface 200 separated from the bottom surface 100 can be changed more flexibly.

The third folding line 30 formed between at least one of the side surfaces 200 and another side surface 200 adjacent to the side surface 200 may extend to each corner 100-C of the bottom surface 100. In addition, the first folding line 10 may be connected to each corner 100-C. In summary, the second cutting line 60, the first folding line 10 and the third folding line 30 meet at each corner 100-C. Accordingly, even if the bottom surface 100 includes the angled corners 100-C, it is surrounded by the side surfaces 200 of the reflection sheet 1000 after the reflection sheet 1000 is folded.

The reflection sheet 1000 may be formed as one sheet. That is, the reflection sheet 1000 may be cut such that the first cutting line 50, the second cutting line 60, the first cover surface 300, the first protruding surface 400, etc. are formed at predetermined locations on one sheet by using a cutter or a laser cutter and that the first folding line 10, the second folding line 20, etc. are formed. Since all parts of the reflection sheet 1000 lie in the same plane as illustrated in FIG. 1, one reflection sheet 1000 can be designed even if only one sheet is used.

The bottom surface 100 includes a plurality of holes h into which light sources can be inserted. Even if the reflection sheet 1000 is placed on the bottom chassis, a plurality of light sources formed on the bottom chassis can be located on the reflection sheet 1000 through the holes h. In addition, the bottom surface 100 may include bolt holes (not shown). The reflection sheet 1000 may be fixed to the bottom chassis by bolts. The reflection sheet 1000 and the bottom chassis can be fixed to each other without damaging the reflection sheet 1000 by inserting the bolts into the bolt holes. If necessary, a through hole (not shown) may be formed in the bottom surface 100 or the side surfaces 200 of the reflection sheet 1000 according to the shape of a circuit board or other devices that may be formed on the bottom chassis.

The reflection sheet 1000 includes a mount surface 210 which extends from the opposite end of at least one of the side surfaces 200 and a first connection surface 310 which is connected to the mount surface 210 and the first cover surface 300. In addition, the reflection sheet 1000 may include a sixth folding line 80 formed along the boundary between the at least one of the side surfaces 200 and the mount surface 210. The sixth folding line 80 enables the at least one of the side surfaces 200 and the mount surface 210 to be folded. The reflection sheet 1000 may further include the first connection surface 310 connecting the mount surface 210 and the first cover surface 300 and a seventh folding line 90 formed along a boundary between the first connection surface 310 and the first cover surface 300. When the reflection sheet 1000 includes the mount surface 210 and the first connection surface 310, the second folding line 20 is formed along the boundary between the first connection surface 310 and the mount surface 210.

The mount surface 210 may be folded outward from the at least one of the side surfaces 200. The first connection surface 310 may be folded to the back of the mount surface 210 and may be substantially parallel to the bottom surface 100 in the assembled reflection sheet 1000. Therefore, the reflection sheet 1000 may be supported by and placed on an edge portion of the bottom chassis which will be described later.

Figure 2:
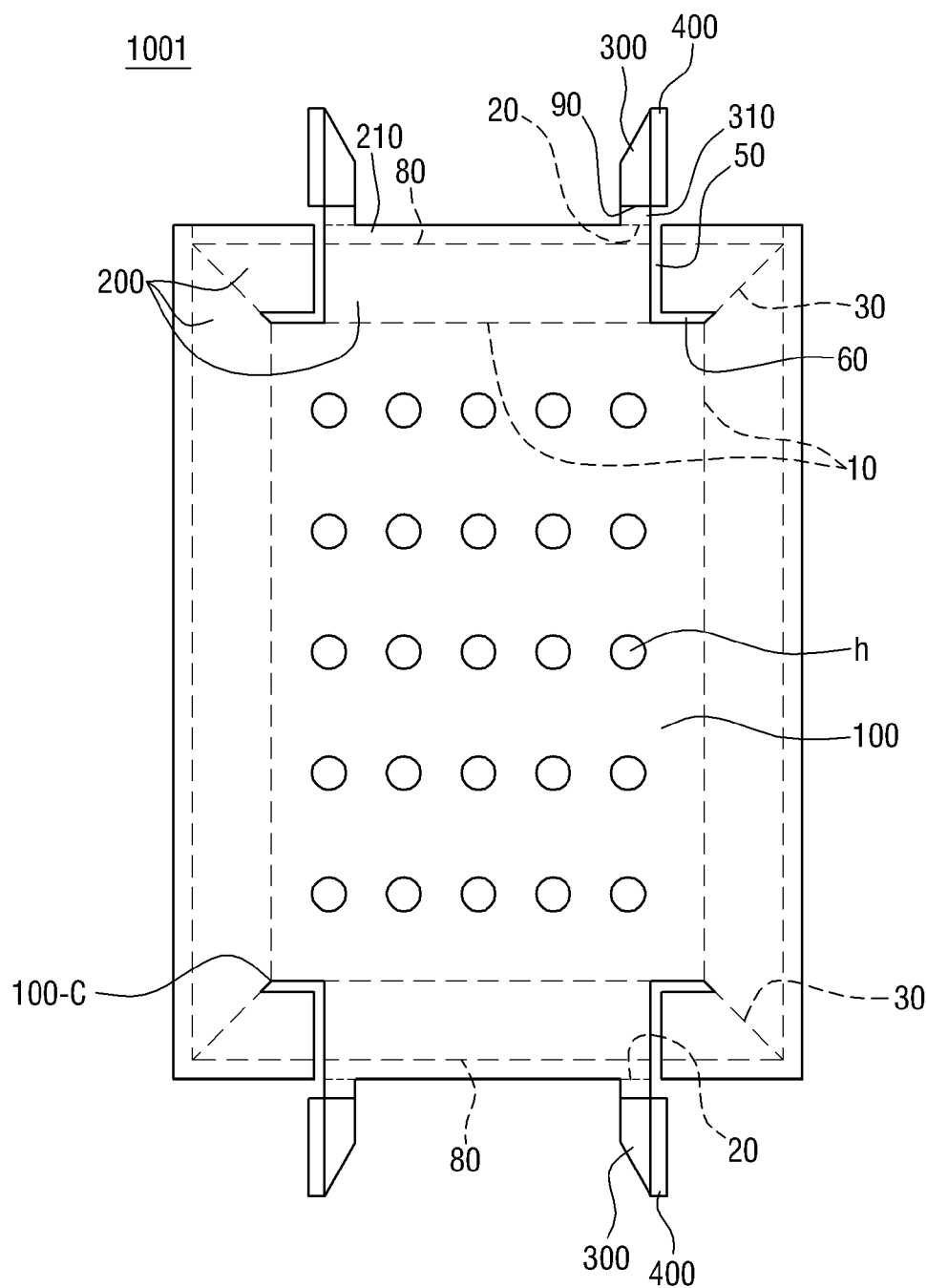
FIGS. 2 through 4 are planar views of reflection sheets according to other embodiments.

FIG. 2 is a planar view of a reflection sheet 1001 according to another embodiment.

Referring to FIG. 2, a first cover surface 300 of the reflection sheet 1001 is formed on a side of a first cutting line 50 which is opposite a side on which the first cover surface 300 of the reflection sheet 1000 of FIG. 1 is formed. In addition, a first protruding surface 400 is formed on the right side of the first cover surface 300. Other elements of the reflection sheet 1001 excluding the locations and directions of the first cover surface 300 and the first protruding surface 400 are identical to those of the reflection sheet 1000 of FIG. 1, and thus detailed descriptions thereof will be omitted.

Figure 3:
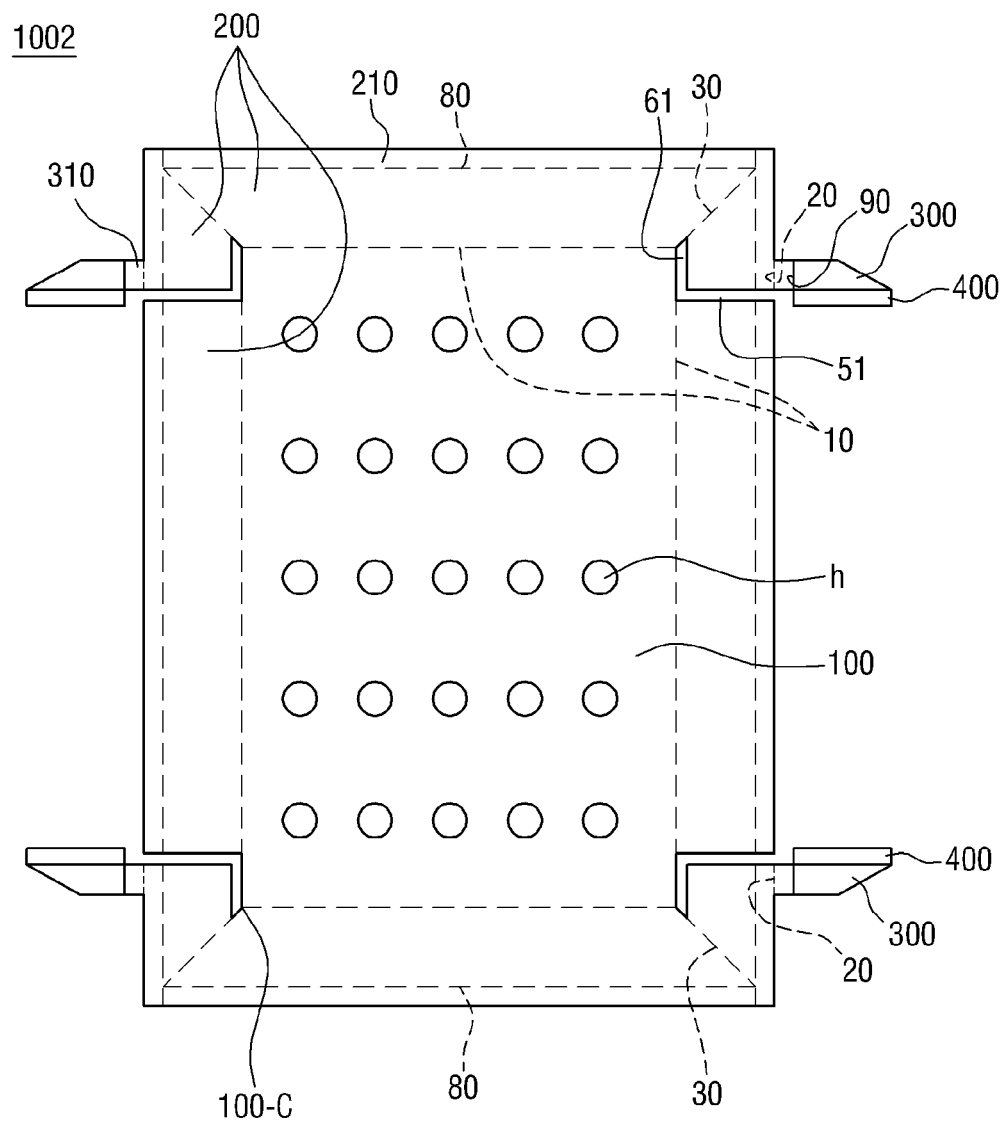

FIG. 3 is a planar view of a reflection sheet 1002 according to another embodiment.

Referring to FIG. 3, a first cutting line 51 of the reflection sheet 1002 is formed on left and right sides of a bottom surface 100. Accordingly, a first cover surface 300 is also formed on the left and right sides of the bottom surface 100. Even in this embodiment, a first protruding surface 400 protrudes toward the first cutting line 51. Other elements of the reflection sheet 1002 are identical to those of the reflection sheet 1000 of FIG. 1, and thus detailed descriptions thereof will be omitted.

Figure 4:
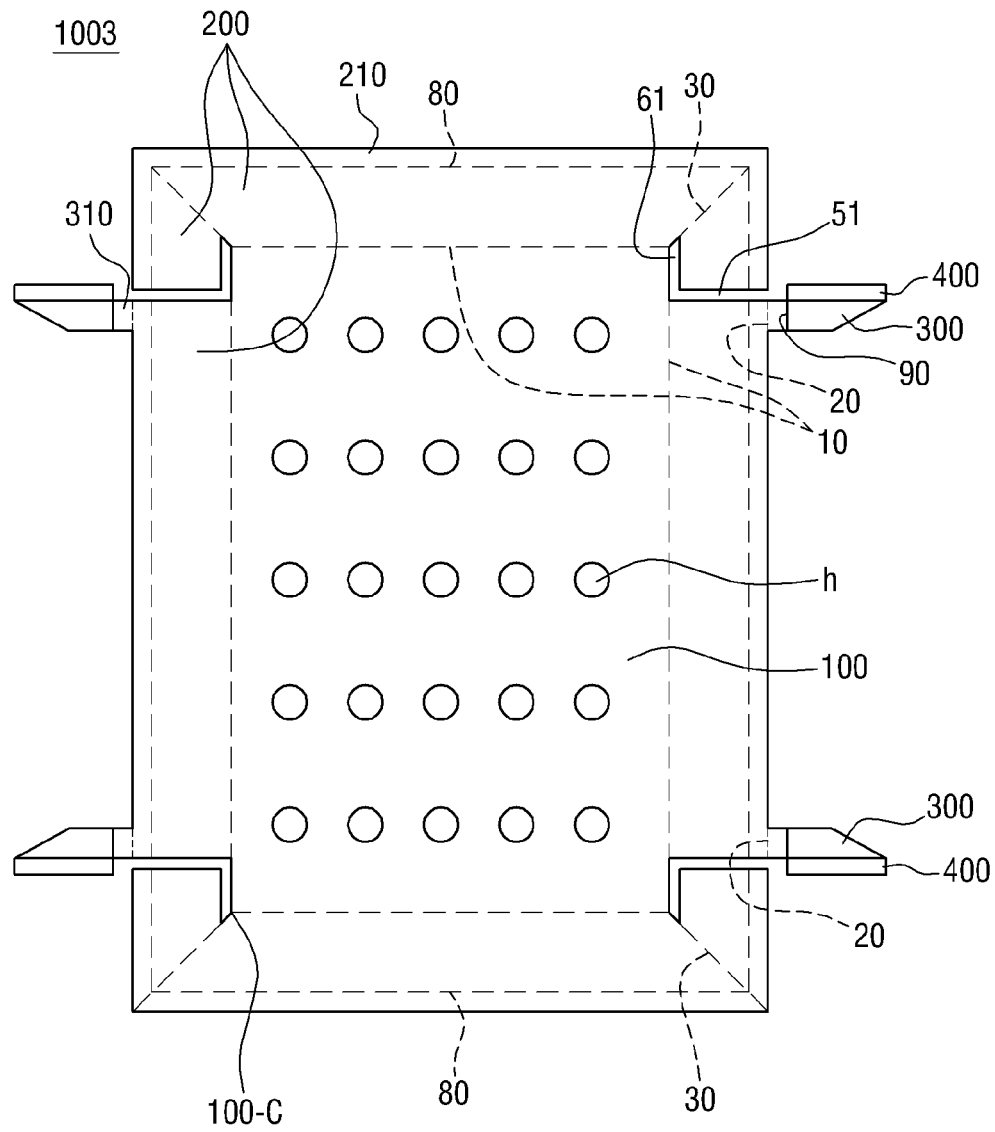

FIG. 4 is a planar view of a reflection sheet 1003 according to yet another embodiment.

Referring to FIG. 4, a first cover surface 300 of the reflection sheet 1003 is formed on a side of a first cutting line 51 which is opposite a side on which the first cover surface 300 of the reflection sheet 1002 of FIG. 3 is formed. Other elements of the reflection sheet 1003 are identical to those of the reflection sheet 1000 of FIG. 1, and thus detailed descriptions thereof will be omitted.

Figure 5:
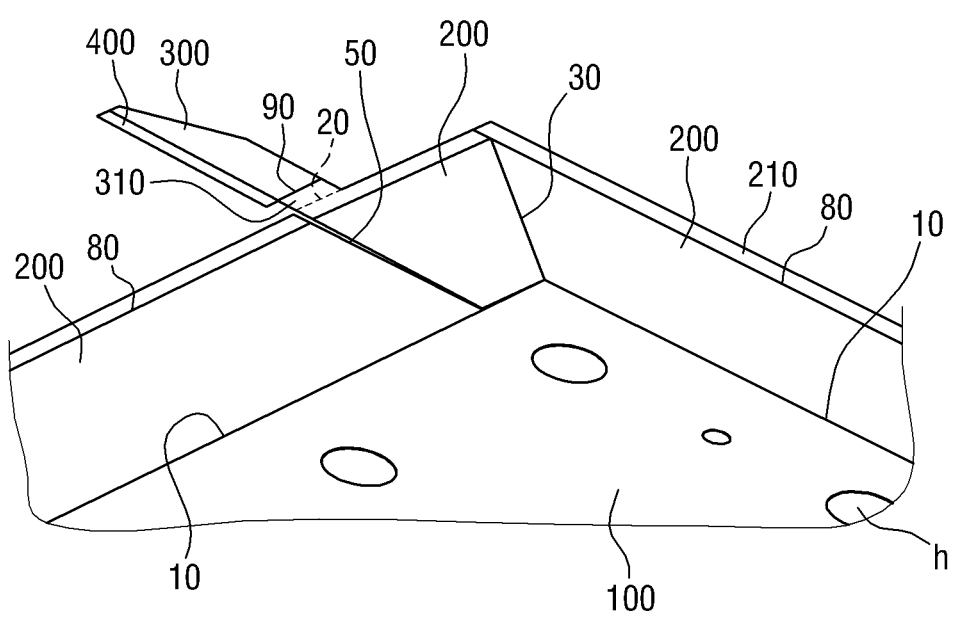
FIGS. 5 through 7 are partial perspective views illustrating a process of assembling the reflection sheet of FIG. 1.
Figure 6:
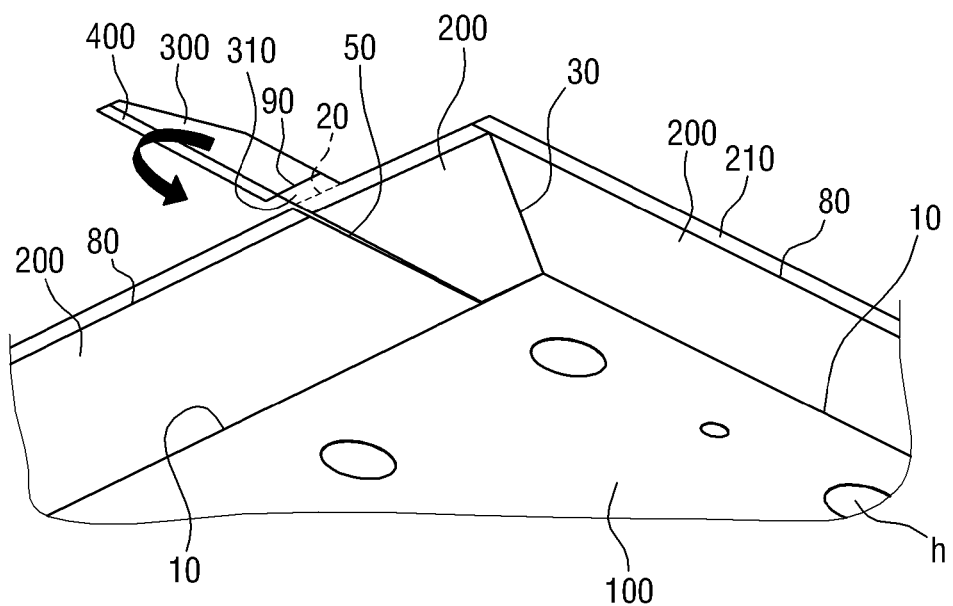
Figure 7:
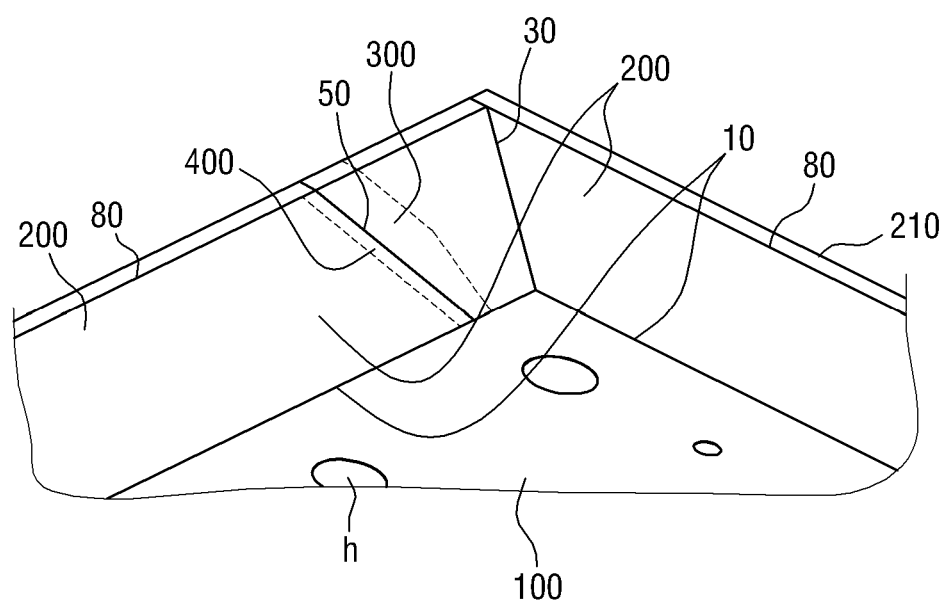

FIGS. 5 through 7 are perspective views illustrating a process of assembling the portion 'A' of the reflection sheet 1000 of FIG. 1. The process of assembling the reflection sheet 1000 will now be described with reference to FIGS. 5 through 7.

Referring to FIG. 5, the side surfaces 200 are folded along the first folding line 10 and the third folding line 30. As described above, the side surfaces 200 are folded obliquely along the first and third folding lines 10 and 30. In addition, since the first cutting line 50 separates at least one of the side surfaces 200 and an adjacent side surface 200 and the second cutting line 60 separates the bottom surface 100 and the at least one side surface 200, the side surfaces 200 can be made to stand obliquely at each corner 100-C of the bottom surface 100 and to surround the bottom surface 100.

Referring to FIG. 6, the first cover surface 300 is folded to the back of the at least one side surface 200 folded up from the bottom surface 100. Here, the first cover surface 300 can be easily folded along the second folding line 20.

After the first cover surface 300 is folded, the first cutting line 50 is covered by the first cover surface 300 and the first protruding surface 400 as illustrated in FIG. 7. As will be described later, the first cutting line 50 may create a space between the at least one side surface 200 and an adjacent side surface 200 in the assembled reflection sheet 1000. Accordingly, a portion of the bottom chassis may not be covered by the reflection sheet 1000. Therefore, the first cover surface 300 and the first protruding surface 400 may cover the space created by the first cutting line 50.

Figure 8:
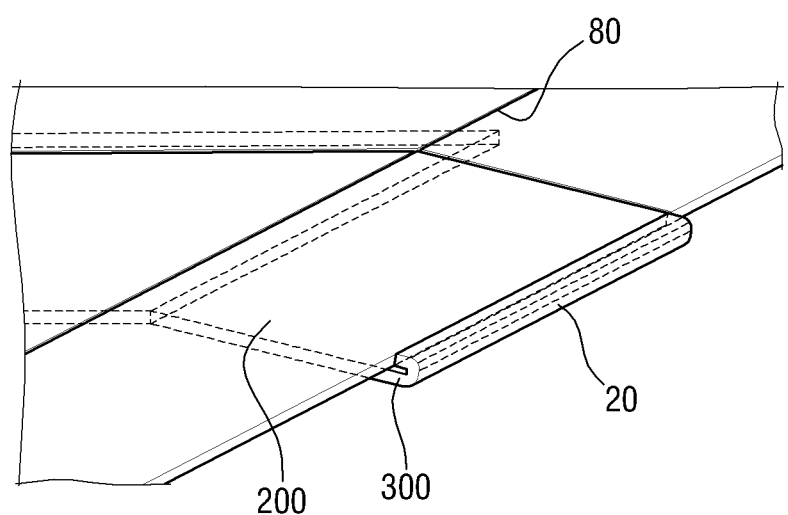
FIG. 8 is an enlarged perspective view of a region including a second folding line in a reflection sheet according to an embodiment.

FIG. 8 is an enlarged view of a region around the second folding line 20 formed along the boundary between a side surface 200 and the first cover surface 300. Referring to FIG. 8, the first cover surface 300 is folded to the back of the side surface 200 to overlap the side surface 200.

Figure 9:
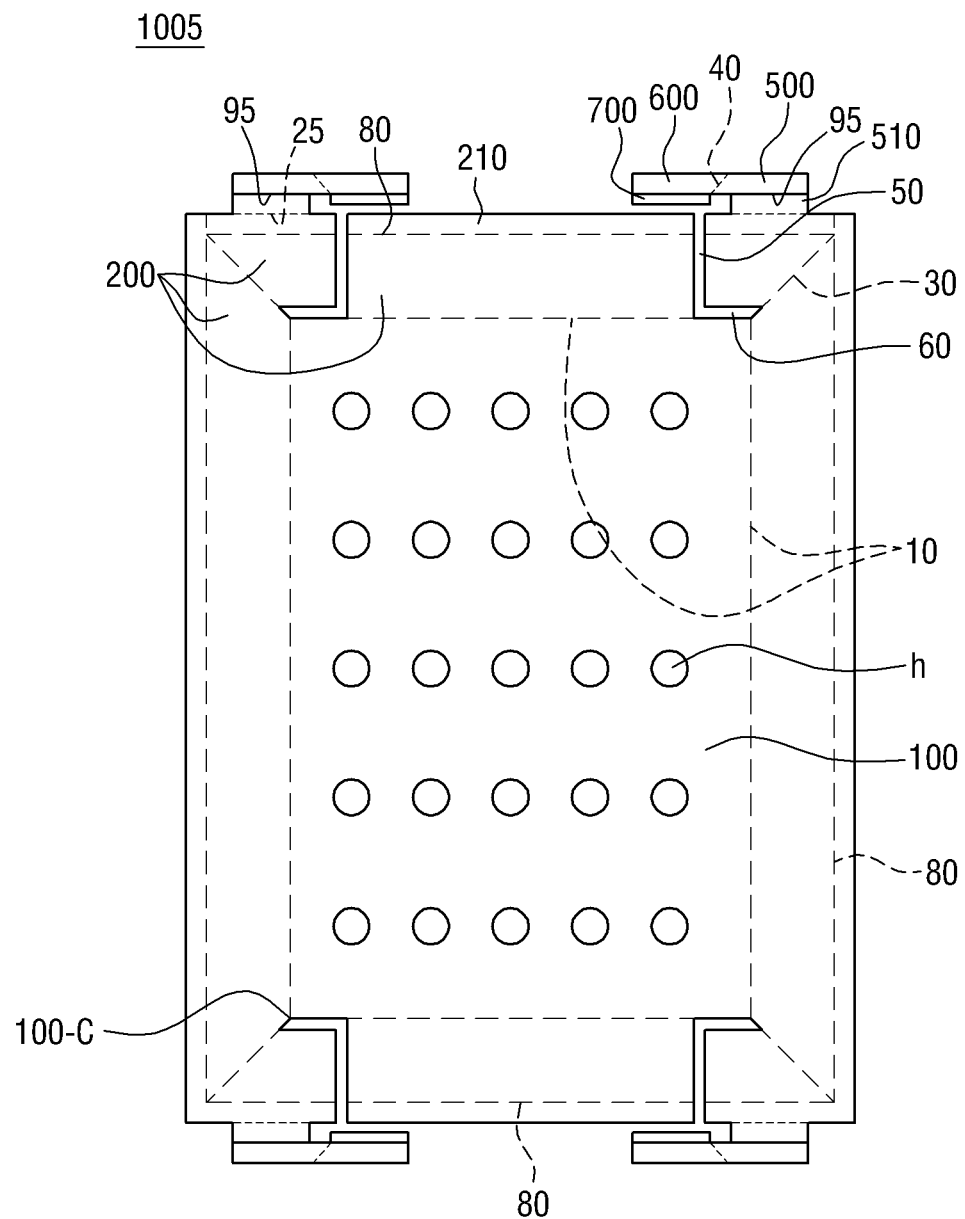
FIGS. 9 and 10 are planar views of reflection sheets according to other embodiments.

FIG. 9 is a planar view of a reflection sheet 1005 according to another embodiment. Referring to FIG. 9, the reflection sheet 1005 includes a bottom surface 100 and a plurality of side surfaces 20 which extend from the bottom surface 100. A first cutting line 50 is formed in at least one of the side surfaces 200 by cutting the at least one side surface 200 from a boundary between the at least one side surface 200 and the bottom surface 100 toward an opposite end of the at least one side surface 200. The reflection sheet 1005 also includes a wing surface 500 which extends from the opposite end of the at least one surface 200, is parallel to the boundary between the bottom surface 100 and the at least one side surface 200 and protrudes toward a direction in which the first cutting line 50 is formed. The reflection sheet 1005 further includes a second cover surface 600 which extends from the wing surface 500.

The wing surface 500 is substantially parallel to the boundary between the bottom surface 100 and the at least one side surface 200 and protrudes toward the first cutting line 50. For example, in FIG. 9, the wing surface 500 extends from a side surface 200 located on an upper side of the bottom surface 100 and protrudes toward the first cutting line 50. In addition, the direction in which the wing surface 500 extends is substantially parallel to a second cutting line 60.

The second cover surface 600 extends from the wing surface 500. That is, the second cover surface 600 extends in the direction in which the wing surface 500 protrudes. Therefore, the second cover surface 600 extends beyond a line extending from the first cutting line 50.

The reflection sheet 1005 further includes a fourth folding line 40 formed between the wing surface 500 and the second cover surface 600. The fourth folding line 40 enables the wing surface 500 and the second cover surface 600 to be easily folded. The fourth folding line 40 is located on a line extending from the first cutting line 50. Thus, the fourth folding line 40 can be folded toward the first cutting line 50.

The second cover surface 600 further includes a second protruding surface 700 which protrudes toward the at least one side surface 200. The second protruding surface 700 extends from the second cover surface 600 in a direction substantially perpendicular to the direction from the wing surface 500 toward the second cover surface 600. The fourth folding line 40 enables the second cover surface 600 to be folded in the direction in which the first cutting line 50 is formed and the second protruding surface 700 protruding from the second cover surface 600 covers the first cutting line 50.

A fifth folding line 25 is formed along the boundary between the at least one side surface 200 and the wing surface 500 extending from the at least one side surface 200. Therefore, the wing surface 500 and the at least one side surface 200 can be easily folded along the fifth folding line 25. The fifth folding line 25 is formed substantially parallel to a first folding line 10 of the at least one side surface 200 having the fifth folding line 25. Since a method of forming the fifth folding line 25 has been described above, a detailed description thereof will be omitted.

The reflection sheet 1005 may include a mount surface 210 which extends from the opposite end of at least one of the side surfaces 200 and a second connection surface 510 which is connected to the mount surface 210 and the wing surface 500. In addition, a sixth folding line 80 may be formed along the boundary between the at least one of the side surfaces 200 and the mount surface 210. The sixth folding line 80 enables the at least one of the side surfaces 200 and the mount surface 210 to be folded. The second connection surface 510 connects the mount surface 210 and the wing surface 500 and an eighth folding line 95 is formed along the boundary between the second connection surface 510 and the wing surface 510. In embodiments where the reflection sheet 1005 includes the mount surface 210 and the second connection surface 510, the fifth folding line 25 is formed along the boundary between the second connection surface 510 and the mount surface 210.

The mount surface 210 is folded outward from the at least one of the side surfaces 200. In addition, the second connection surface 510 is folded to the back of the mount surface 210 and is substantially parallel to the bottom surface 100 in the assembled reflection sheet 1005. Therefore, the reflection sheet 1005 can be supported by and placed on the edge portion of the bottom chassis which will be described later.

Figure 10:
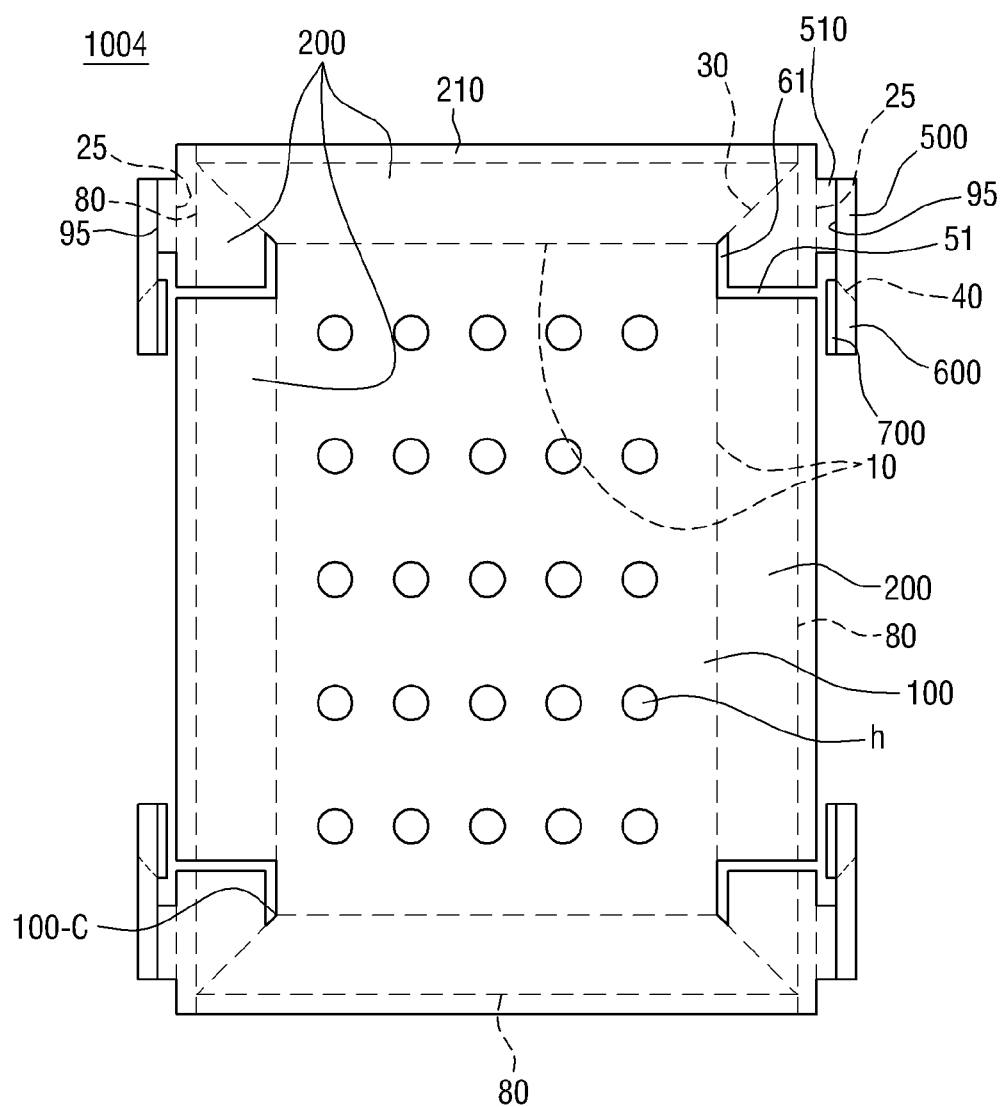

FIG. 10 is a planar view of a reflection sheet 1004 according to another embodiment.

Referring to FIG. 10, a first cutting line 51 and a second cutting line 61 of the reflection sheet 1004 are located on left and right sides of a bottom surface 100. In addition, a wing surface 500 and a second cover surface 600 are located on the left and right sides of the bottom surface 100 based on the location of the first cutting line 51 and the second cutting line 61. Other elements of the reflection sheet 1004 excluding the above described arrangement are identical to those in the reflection sheet 1005 of FIG. 9, and thus detailed descriptions thereof will be omitted.

Figure 11:
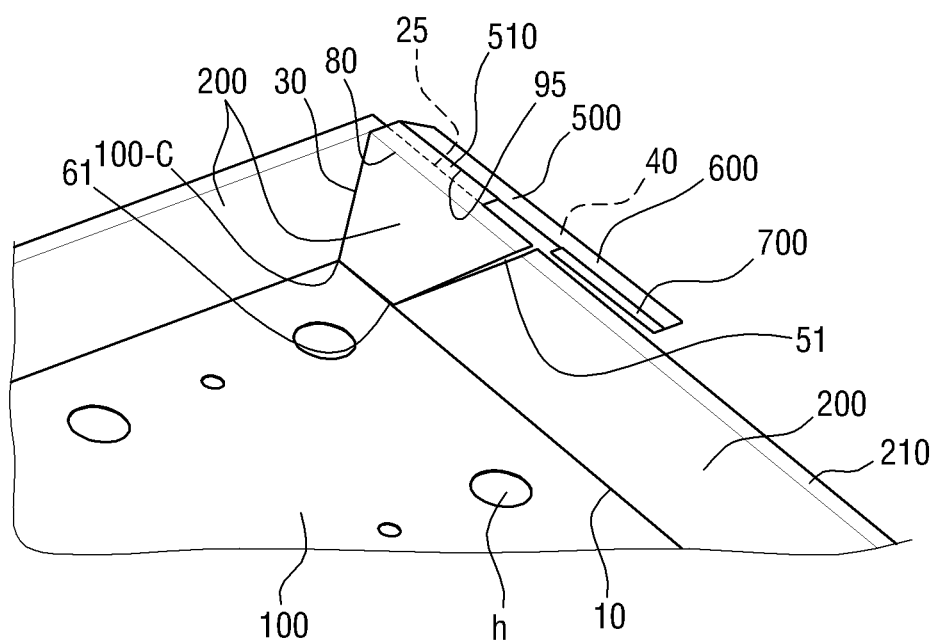
FIGS. 11 through 13 are partial perspective views illustrating a process of assembling the reflection sheet of FIG. 10.
Figure 12:
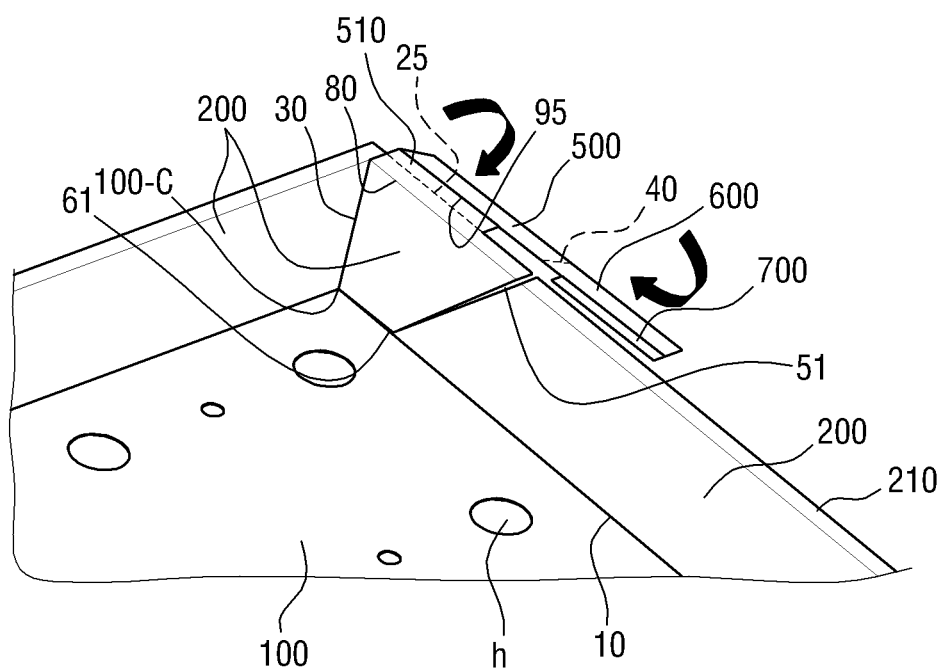
Figure 13:
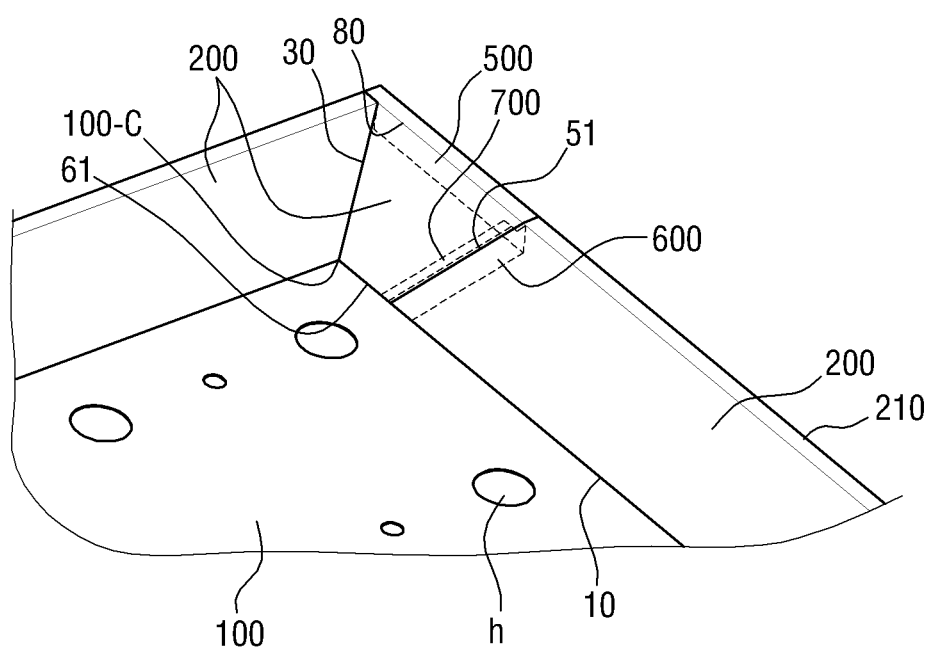

FIGS. 11 through 13 illustrate a process of assembling the reflection sheet 1004 of FIG. 10. The process of assembling the reflection sheet 1004 of FIG. 10 will now be described.

After the reflection sheet 1004 of FIG. 10 is prepared, a plurality of side surfaces 200 are folded along a first folding line 10 and a third folding line 30 as illustrated in FIG. 11. The side surfaces 200 are obliquely folded along the pre-designed first and third folding lines 10 and 30. In addition, since the first cutting line 51 separates at least one of the side surfaces 200 and an adjacent side surface 200 and the second cutting line 61 separates the bottom surface 100 and the at least one side surface 200, the side surfaces 200 can be easily made to stand obliquely at each corner 100-C of the bottom surface and to surround the bottom surface 100.

Referring to FIG. 12, the at least one side surface 200 and the wing surface 500 are folded along a fifth folding line 25 such that the wing surface 500 is folded to the back of the at least one side surface 200. In addition, the wing surface 50 and the second cover surface 60 are folded along a fourth folding line 40. The second cover surface 600 is folded in a direction substantially perpendicular to the wing surface 500. However, the described technology is not limited thereto, and the second cover surface 600 may also be folded toward the bottom surface 100 from a direction in which the wing surface 500 extends.

The second cover surface 600 folded toward the bottom surface 100 is substantially parallel to the first cutting line 51. A space may be created between the assembled side surfaces 200 by the first cutting line 51. The space is covered by a second protruding surface 700 which protrudes from the second cover surface 600.

The assembled reflection sheet 1004 is illustrated in FIG. 13. Referring to FIG. 13, a space created by the first cutting line 51 is covered by the second protruding surface 700. However, the described technology is not limited thereto. That is, the second protruding surface 700 is not be formed in some embodiments, and the space between the side surfaces 200 is covered by the second cover surface 600 in these embodiments.

Figure 14:
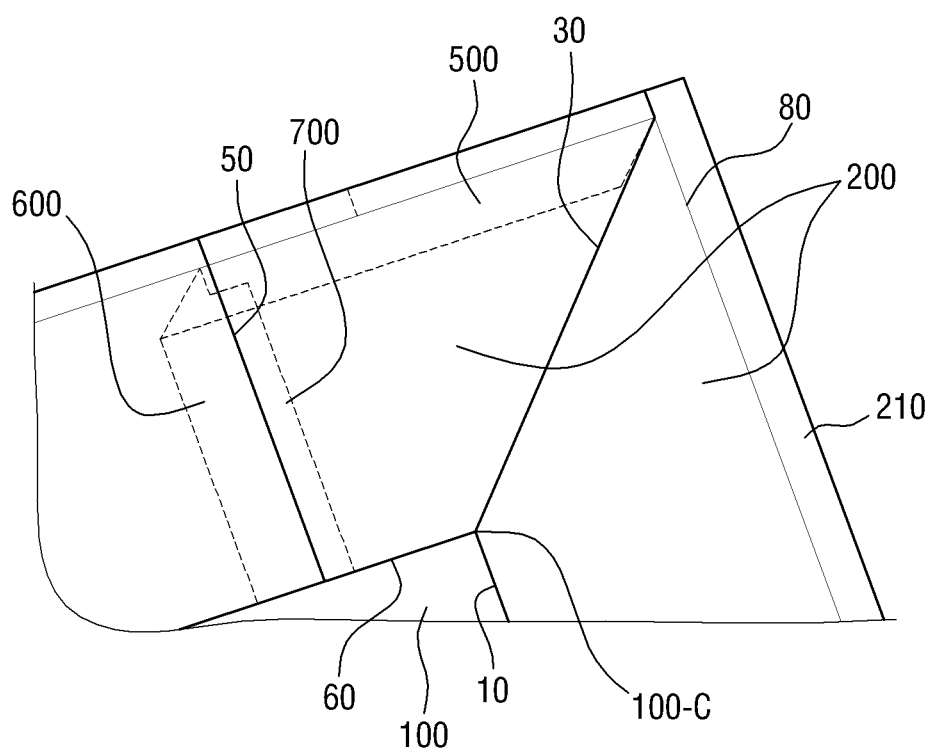
FIG. 14 is a partial enlarged view of the reflection sheet of FIG. 9 after assembly.

The reflection sheet 1005 of FIG. 9 can be assembled into the shape illustrated in FIG. 14. Since other elements of the reflection sheet 1005 have been described above, a detailed description thereof will be omitted.

As described above, the reflection sheet according to the at least one embodiment can be manufactured using one sheet. For example, the reflection sheet can be designed on one sheet as illustrated in the schematic diagrams of FIGS. 15 and 16.

Figure 15:
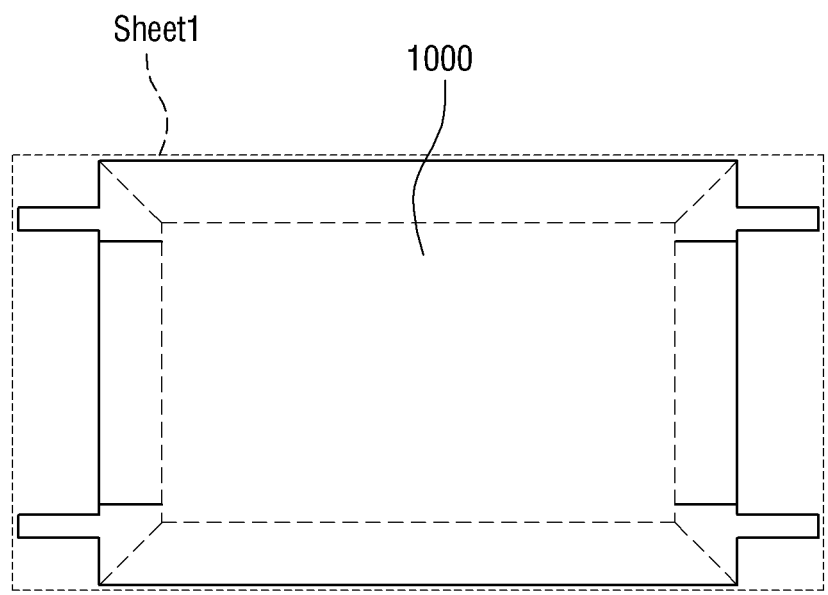
FIGS. 15 and 16 are schematic planar views of reflection sheets, each formed from a single sheet.
Figure 16:
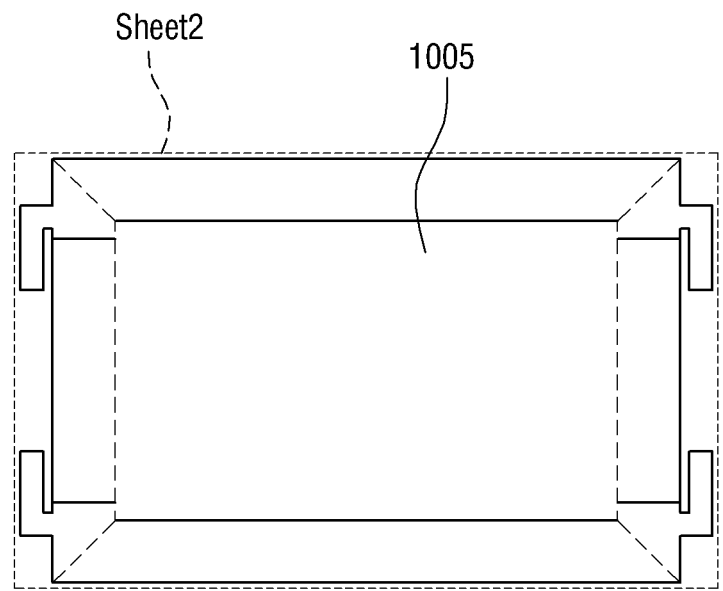

FIG. 15 is a reflection sheet including a first cover surface according to an embodiment. FIG. 16 is a reflection sheet including a wing surface and a second cover surface according to an embodiment. The reflection sheet including the wing surface and the second cover surface illustrated in FIG. 16 can be manufactured using a sheet with a smaller area than the area of the reflection sheet including the first cover surface only.

The reflection sheet may be made of a light-reflecting material. For example, the reflection sheet may be made of a material such as, but not limited to, polyethylene terephthalate (PET). Since the material of the reflection sheet is widely known to those of ordinary skill in the art, a detailed description thereof will be omitted.

Figure 17:
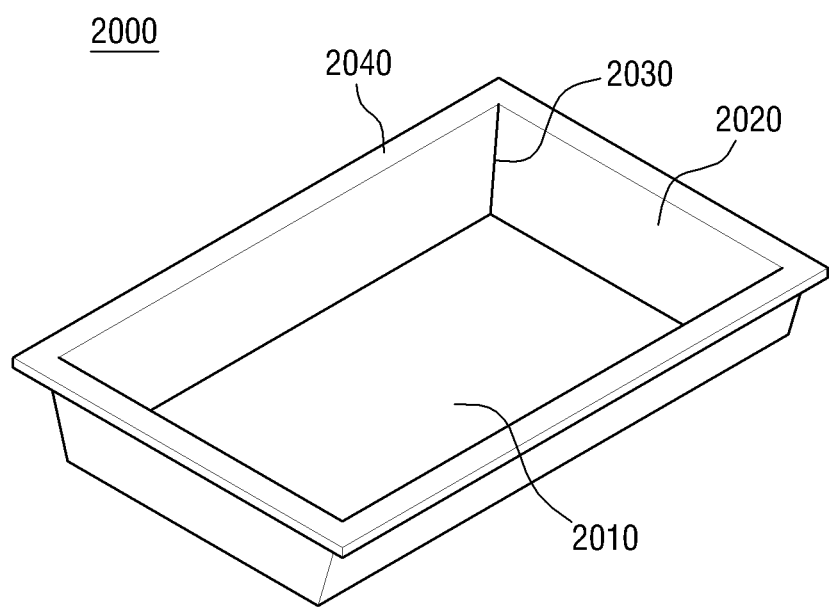
FIG. 17 is a perspective view of a bottom chassis according to an embodiment.
Figure 18:
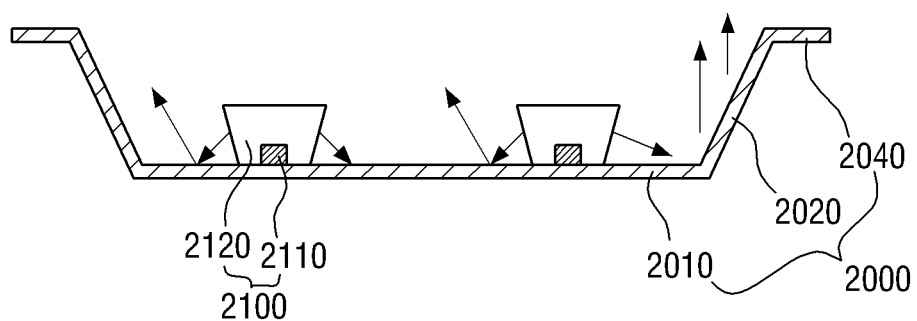
FIG. 18 is a cross-sectional view of the bottom chassis of FIG. 17 illustrating a plurality of light sources placed on the bottom chassis.

FIG. 17 is a perspective view of a bottom chassis 2000 used in a backlight unit according to an embodiment. FIG. 18 is a cross-sectional view of the bottom chassis 2000 of FIG. 17 and a plurality of light sources 2100 placed on the bottom chassis 2000.

The backlight unit according to an embodiment will now be described with reference to FIGS. 17 and 18.

The backlight unit includes the light sources 2100, the bottom chassis 2000 which houses the light sources 2100 and includes a bottom portion 2010 and a plurality of sidewalls 2020, and a reflection sheet (not shown) which is placed on the bottom chassis 2000 and covers the bottom portion 2010 and the sidewalls 2020.

As described above, the reflection sheet includes a bottom surface which covers the bottom portion 2010 of the bottom chassis 2000 and a plurality of side surfaces which cover the sidewalls 2020 of the bottom chassis 2000. A first cutting line is formed in at least one of the side surfaces by cutting the at least one side surface from a boundary between the at least one side surface and the bottom surface toward an opposite end of the at least one side surface. The reflection sheet also includes a first cover surface which extends from the opposite end of the at least one side surface. The first cover surface is placed between the at least one side surface of the reflection sheet and a corresponding sidewall 2020 of the bottom chassis 2000 to cover the first cutting line.

Referring to FIG. 17, the sidewalls 2020 of the bottom chassis 2000 surround the bottom portion 2010 and are formed obliquely to the bottom portion 2010. In other words, the sidewalls 2020 of the bottom chassis 2000 slope outward. An open space formed by the sidewalls 2020 of the bottom chassis 2000 widens as the vertical distance from the bottom portion 2010 increases. Therefore, light emitted from the light sources 2100 and then reflected can be spread widely and propagate upward accordingly.

In addition, the bottom chassis 2000 includes an edge portion 2040 which extends outward from the sidewalls 2020. A mount surface of the reflection sheet is supported by and placed on the edge portion 2040 and a plurality of optical sheets which will be described later may be placed on the mount surface of the reflection sheet.

The light sources 2100 are placed on the bottom portion 2010 of the bottom chassis 2000. Each of the light sources 2100 includes a circuit board (not shown), a light-emitting module 2110 which is electrically connected to the circuit board, and an optical lens 2120 which is arranged on the light-emitting module 2110. A plurality of light-emitting modules 2110 can be formed and can be arranged at regular intervals on the bottom portion 2010 of the bottom chassis 2000.

The light-emitting modules 2110 are separated from each other in one direction on the circuit board. Each of the light-emitting modules 2110 may include a light-emitting diode (LED) package and the LED package may be mounted on the circuit board by chip-on-board (COB) technology, but the described technology is not limited thereto. When each of the light-emitting modules 2110 is formed as an LED package, the LED package may include an LED chip formed within a molding frame and encapsulated by an encapsulant.

Each of the light-emitting modules 2110 emits light when receiving an electrical signal from the circuit board. The circuit board includes a circuit pattern (not shown) in order to transmit electrical signals to the light-emitting modules 2110. The circuit pattern may be made of a metal material having sufficient electrical conductivity and thermal conductivity, such as gold (Au), silver (Ag), or copper (Cu).

The circuit board may be a printed circuit board (PCB) or may be made of an organic resin material containing epoxy, triazine, silicon, polyimide and/or other organic resin materials. The circuit board may also be a flexible printed circuit board (FPCB) or a metal core printed circuit board (MCPCB).

The circuit boards may be arranged in one direction to be substantially parallel to each other on the bottom portion 2010 of the bottom chassis 2000. Alternatively, the circuit boards may be arranged substantially parallel to each other in a direction perpendicular to the above described direction. In some embodiments, the circuit boards are arranged in a matrix.

The circuit board may be attached onto the bottom portion 2010 of the bottom chassis 2000 by an adhesive member (not shown). Examples of the adhesive member may include, but not limited to, a heat-dissipation tape, a double-sided tape, resin, urethane, and other adhesives.

The optical lens 2120 may be formed on the light-emitting module 2110 to concentrate light emitted from the light-emitting module 2110 or change the direction of the light to a desired emission direction. In FIG. 18, light emitted from the light-emitting module 2110 is directed toward the bottom portion 2010 of the bottom chassis 2000 by the optical lens 2120. When the light reaches the bottom surface of the reflection sheet placed on the bottom chassis 2000, the reflection sheet reflects the light upward, so that the light can propagate substantially uniformly toward a display panel.

Therefore, the optical lens 2120 may be tapered upward, that is, may become wider in an upward direction. In other words, the optical lens 2120 may be, but is not limited to, a side emission-type lens whose horizontal cross-section becomes wider in an upward direction.

Figure 19:
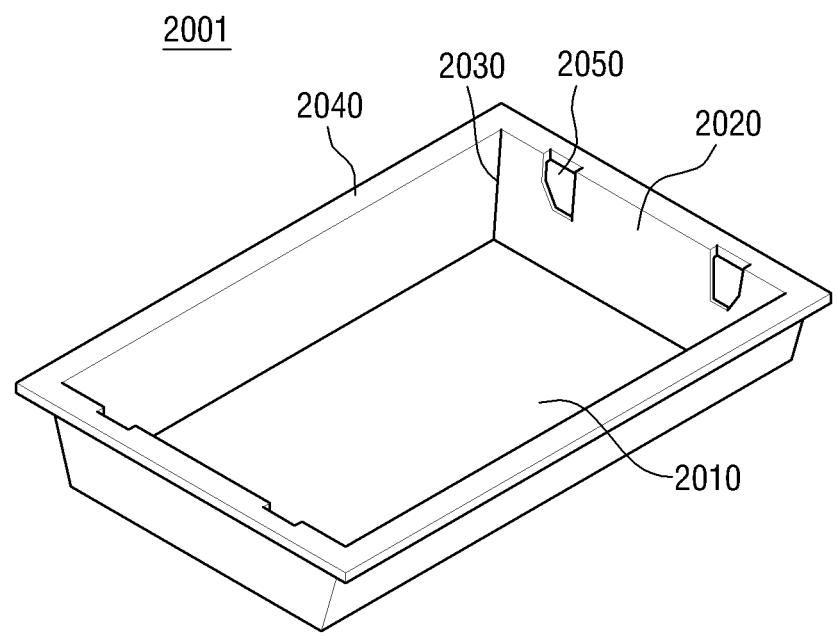
FIGS. 19 and 20 are perspective views of a bottom chassis according to other embodiments.

FIG. 19 illustrates a bottom chassis 2001 according to another embodiment. Referring to FIG. 19, sidewalls 2020 of the bottom chassis 2001 include engraved holes or recesses 2050, each having a shape corresponding to the shape of a first cover surface of a reflection sheet. Each of the engraved holes 2050 is formed at a location where the first cover surface contacts a corresponding sidewall 2020 of the bottom chassis 2001. Therefore, when the reflection sheet is placed on the bottom chassis 2001, the first cover surface of the reflection sheet can be inserted into each of the engraved holes 2050 of the bottom chassis 2001.

When the first cover surface is folded in the process of assembling the reflection sheet, the thickness at a location where the surface of the reflection sheet is folded increases. Therefore, each of the engraved holes 2050 is formed at the location where the first cover surface and the corresponding sidewall 2020 of the bottom chassis 2001 contact each other. This can prevent the location from becoming thicker than other portions of the reflection sheet.

Figure 20:
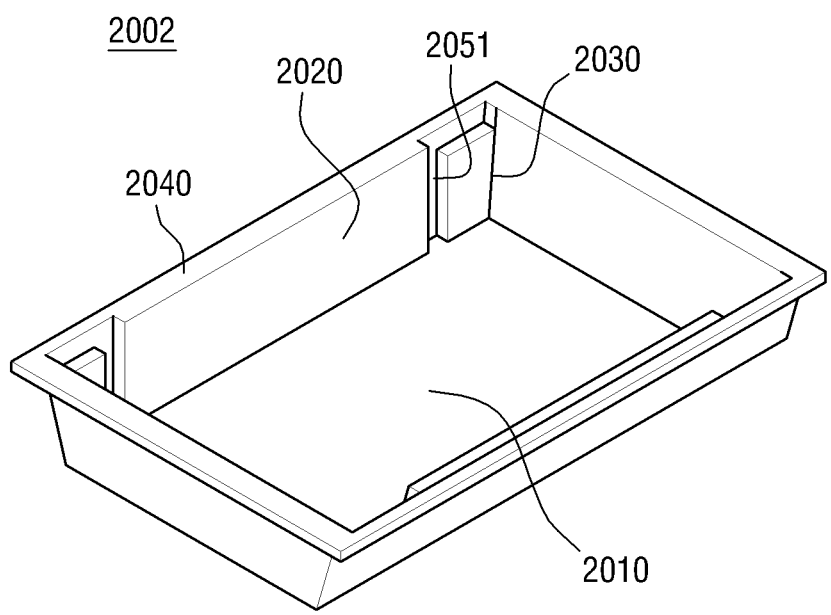

When the reflection sheet 1004 including the wing surface 500 and the second cover surface 600 as illustrated in FIG. 10 is used, a bottom chassis 2002 as illustrated in FIG. 20 may be used. That is, the bottom chassis 2002 according to the embodiment of FIG. 20 includes an engraved hole having a shape corresponding to the shape of a portion of the reflection sheet 1004 which is folded into a space between the bottom chassis 2002 and the reflection sheet 1004. The engraved hole prevents a difference in thickness between the above portion and other portions of the reflection sheet 1004.

Figure 21:
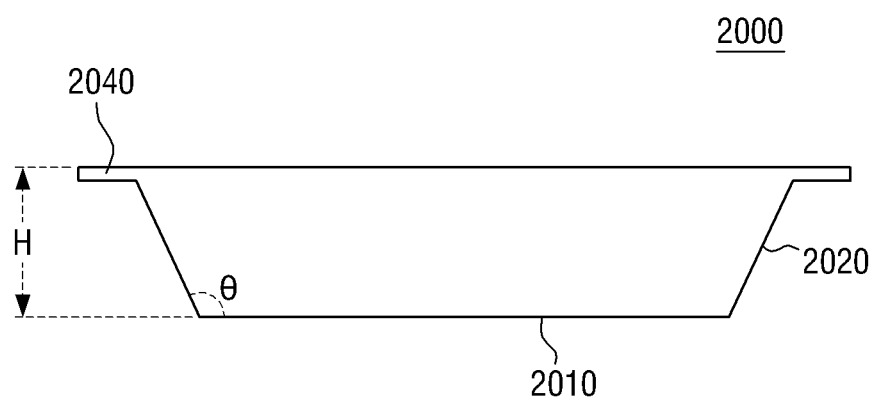
FIG. 21 is a cross-sectional view of the bottom chassis of FIG. 17.

FIG. 21 is a cross-sectional view of the bottom chassis 2000 of FIG. 17. Referring to FIG. 21, the sidewalls 2020 of the bottom chassis 2000 slope at an obtuse angle to the bottom portion 2010. That is, an angle θ formed by the bottom portion 2010 and each of the sidewalls 2020 is an obtuse angle such that reflected light can be spread upward.

In addition, the height H from the bottom portion 2010 of the bottom chassis 2000 to an upper end of each of the sidewalls 2020 may be about 0.3 mm to about 0.5 mm. Likewise, the height from the bottom surface of the reflection sheet placed on the bottom chassis 2000 to an upper end of each side surface of a reflection sheet may be about 0.3 mm to about 0.5 mm. Therefore, a display device can be manufactured with a thin profile. More specifically, optical sheets which will be described later may be stacked on the bottom chassis 2000. Although the gap between the bottom surface of the reflection sheet and the optical sheets is very small, since the reflection sheet according to at least one embodiment can cover the space created by a first cutting line, luminance imbalance caused by the space can be prevented. Therefore, it is possible to manufacture a backlight unit which can provide light with a substantially uniform luminance even in a thin display device. However, according to some embodiments, the height H of each of the bottom chassis 2000 and the reflection sheet is less than about 0.3 mm or greater than about 0.5 mm.

Figure 22:
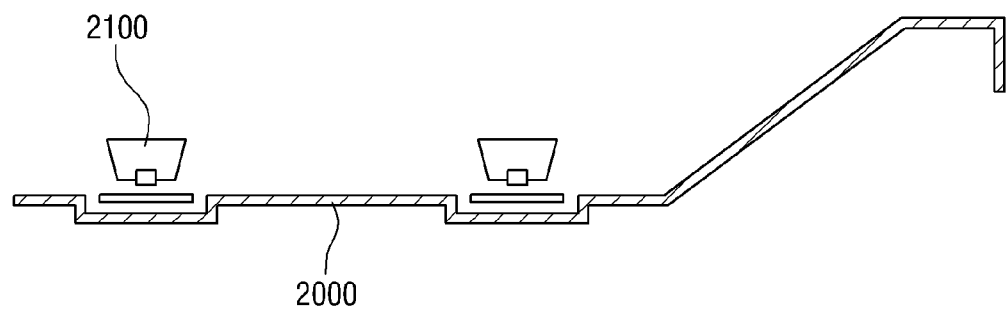
FIGS. 22 through 24 are cross-sectional views schematically illustrating a process of placing a reflection sheet on a bottom chassis.
Figure 23:
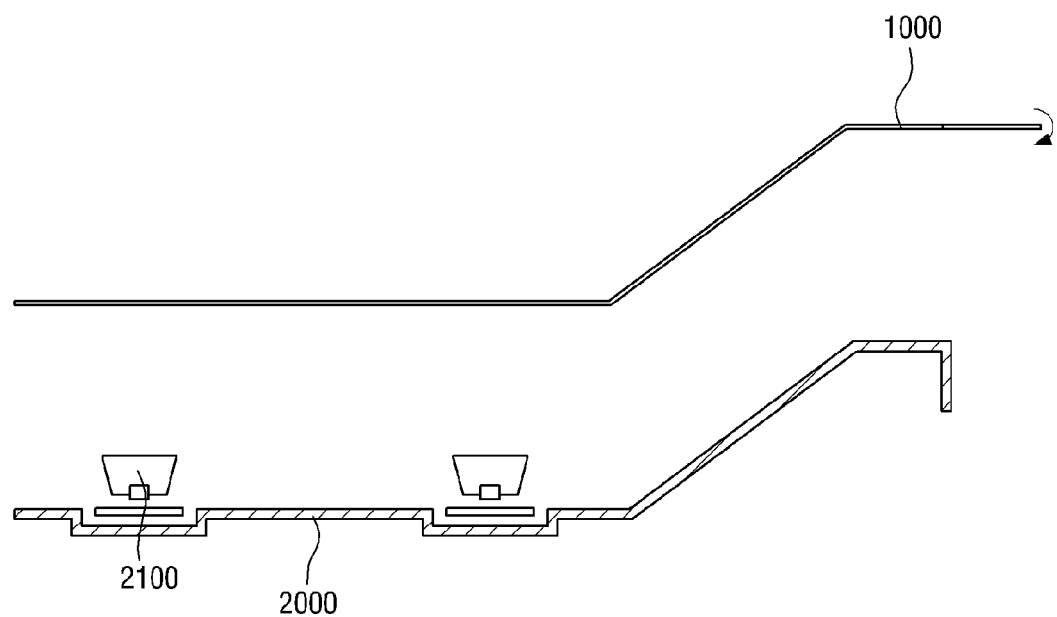
Figure 24:
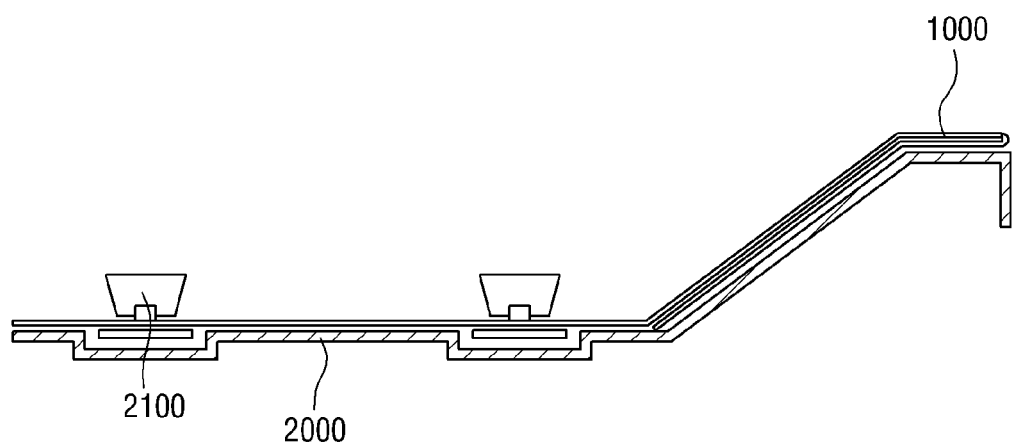

FIGS. 22 through 24 illustrate a schematic process of placing a reflection sheet 1000 on a bottom chassis 2000.

Referring to FIGS. 22 through 24, a first cover surface 300 of the reflection sheet 1000 is folded into a space between the reflection sheet 1000 and the bottom chassis 2000 having light sources 2100. The reflection sheet 1000 is then placed on the bottom chassis 2000. More specifically, the reflection sheet 1000 may further include a second folding line formed along a boundary between the first cover surface 300 and at least one side surface as described above. The first cover surface 300 is folded between the at least one side surface of the reflection sheet and a corresponding sidewall of the bottom chassis 2000 to cover a first cutting line. Since light source holes are formed in a bottom surface of the reflection sheet 1000, the light sources 2100 pass through the light source holes and the reflection sheet 1000 is placed flat on the bottom chassis 2000.

Figure 25:
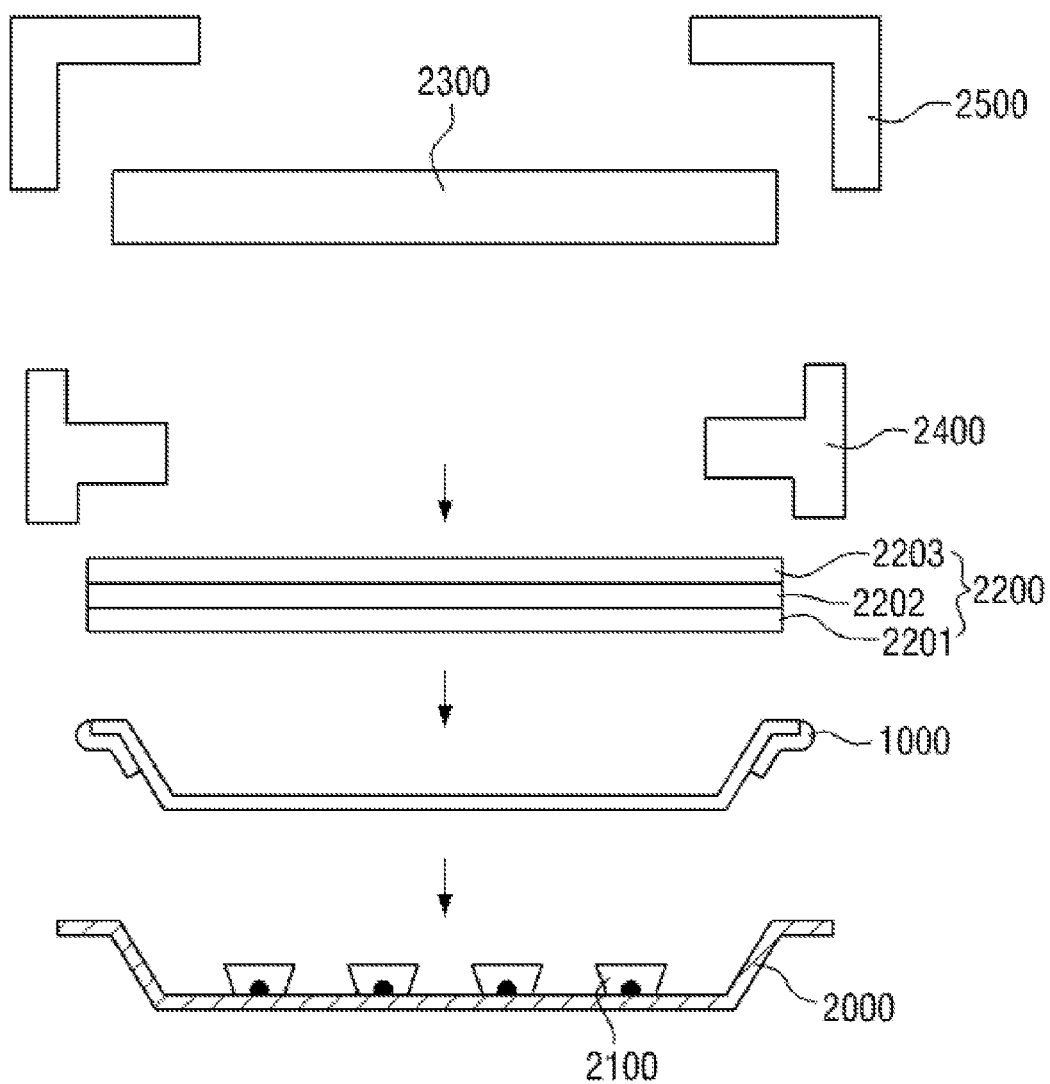
FIG. 25 is a schematic cross-sectional view of a display device including the backlight unit of the described technology.

FIG. 25 is a schematic cross-sectional view of a display device 3000 including a backlight unit according to an embodiment. The display device 3000 including the backlight unit will now be described with reference to FIG. 25.

Referring to FIG. 25, the display device 3000 includes light sources 2100 which are located on a bottom chassis 2000, a reflection sheet 1000 which is placed on the bottom chassis 2000, a plurality of optical sheets 2200 which are placed on the reflection sheet 1000, a display panel 2300 which displays images when receiving light from the light sources 2100, a middle frame 2400 which is interposed between the optical sheets 2200 and the display panel 2300 to support the display panel 2300, and a top chassis 2500 which is located on the display panel 2300 and is connected to the bottom chassis 2000.

The optical sheets 2200 includes a diffusion sheet 2201, a prism sheet 2202, and a protective sheet 2203 to improve the optical performance of the display device 3000. The diffusion sheet 2201 diffuses light received directly from the light sources 210 or light reflected by the reflection sheet 1000, such that light with a more uniform luminance distribution can be emitted toward the display panel 2300. The prism sheet 2202 focuses light diffused by the diffusion sheet 2201 to the display panel 2300 thereabove. More specifically, the prism sheet 2202 causes the diffused light to enter the display panel 2300 at an angle substantially perpendicular to the flat surface of the display panel 2300. The protective sheet 2203 protects prism lenses formed on the prism sheet 2202.

A microlens array sheet, a lenticular lens sheet, etc. may also be used in addition to the diffusion sheet 2201 and the prism sheet 2202. For example, some of the optical sheets may be used more than once or may be omitted, or the arrangement of the optical sheets may be changed as desired by those of ordinary skill in the art.

The display panel 2300 may include a liquid crystal layer (not shown) interposed between thin-film transistor (TFT) substrates, a color filter substrate (not shown), a polarizing filter (not shown), and a driver integrated circuit (IC). The display panel 2300 displays images by adjusting the intensity of light incident from the backlight unit.

The top chassis 2500 includes a window which partially covers the display panel 2300 and exposes an image displayed on the display panel 2300.

Since the optical sheets 2200, the display panel 2300, and the top chassis 2500 are widely known to those of ordinary skill in the art, a detailed description thereof will be omitted.

However, the effects of the described technology are not restricted to those set forth herein. The above and other effects will become more apparent to one of ordinary skill in the art to which the described technology pertains by referencing the claims.

While the described technology has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A reflection sheet for a backlight, comprising:
   a bottom surface;
   a plurality of side surfaces, each of the side surfaces extending from the bottom surface and having a first edge formed on an opposite side of a corresponding side surface with respect to the bottom surface;
   a first cutting line formed in at least a first one of the side surfaces from a boundary between the first side surface and the bottom surface toward the first edge of the first side surface; and
   a cover surface extending from the first edge of the first side surface,
   wherein the cover surface comprises a protruding surface protruding toward the first cutting line.

2. The reflection sheet of claim 1, further comprising a first folding line formed along at least part of the boundary between the bottom surface and each of the side surfaces.

3. The reflection sheet of claim 1, further comprising a second folding line formed along a boundary between the cover surface and the first side surface.

4. The reflection sheet of claim 1, further comprising a third folding line formed between two adjacent side surfaces of the side surfaces.

5. The reflection sheet of claim 1, further comprising a second cutting line connected to the first cutting line and formed along the boundary between the first side surface and the bottom surface.

6. The reflection sheet of claim 5, wherein the bottom surface comprises a corner.

7. The reflection sheet of claim 6, wherein the second cutting line extends to the corner of the bottom surface.

8. The reflection sheet of claim 6, wherein the first cutting line is formed adjacent to the corner of the bottom surface.

9. The reflection sheet of claim 6, further comprising a third folding line formed between two adjacent side surfaces of the side surfaces, wherein the third folding line extends to the corner of the bottom surface.

10. The reflection sheet of claim 1, wherein the reflection sheet is formed as a single sheet.

11. The reflection sheet of claim 1, wherein the first edge of the first side surface defines an outer edge of the reflection sheet.

12. The reflection sheet of claim 1, wherein the first cutting line defines a substantially linear gap in the first side surface extending from the boundary between the first side surface and the bottom surface toward the first edge of the first side surface.

13. A reflection sheet for a backlight, comprising:
   a bottom surface;
   a plurality of side surfaces, each extending from the bottom surface and having an edge opposing the bottom surface;
   a cutting line formed in at least a first one of the side surfaces from a boundary between the first side surface and the bottom surface toward the opposing edge of the first side surface;
   a wing surface extending from the edge of the first side surface, wherein the wing surface is substantially parallel to the boundary between the first side surface and the bottom surface and protrudes toward the cutting line; and
   a cover surface extending from the wing surface.

14. The reflection sheet of claim 13, further comprising a first folding line formed between the wing surface and the cover surface.

15. The reflection sheet of claim 13, further comprising a second folding line formed along a boundary between the wing surface and the first side surface.

16. The reflection sheet of claim 13, wherein the cover surface further comprises a protruding surface which protrudes toward the first side surface.

17. A backlight unit, comprising:
a light source;
a bottom chassis housing the light source and comprising a bottom portion and a plurality of sidewalls; and
a reflection sheet placed on the bottom chassis and covering the bottom portion and the sidewalls,
wherein the reflection sheet comprises:
a bottom surface covering the bottom portion of the bottom chassis;
a plurality of side surfaces respectively covering the sidewalls of the bottom chassis, wherein each side surface has an edge opposing the bottom surface;
a cutting line formed in at least a first one of the side surfaces from a boundary between the first side surface and the bottom surface toward the opposing edge of the first side surface; and
a cover surface which extends from the opposing edge of the first side surface,
wherein the cover surface is placed between the first side surface of the reflection sheet and a corresponding sidewall of the bottom chassis so as to cover the cutting line.

18. The backlight unit of claim 17, further comprising a folding line formed along a boundary between the cover surface and the first side surface, wherein the bottom chassis comprises a recess and wherein the cover surface is folded into the recess.

19. The backlight unit of claim 17, wherein the corresponding sidewall of the bottom chassis comprises a recess having a shape corresponding to the shape of the cover surface, wherein the recess is formed in a location where the cover surface and the corresponding sidewall contact each other.

20. The backlight unit of claim 19, wherein the cover surface is inserted into the recess.

21. The backlight unit of claim 17, wherein the sidewalls of the bottom chassis form an obtuse angle with the bottom portion.

22. The backlight unit of claim 17, wherein the height from the bottom surface of the reflection sheet to an upper end of each of the side surfaces is about 0.3 mm to about 0.5 mm.

* * * * *